an elevator car position uses position markers situated in the elevator shaft and each assigned a discrete car position, first and second detection devices on the elevator car detecting first and second position markers respectively, and an evaluation unit that determines first and second discrete car positions based on the detected first and second position markers respectively. A single interpolation device of the position determining system determines first and second interpolated car positions. The evaluation unit determines first and second car positions based on the first and second discrete car positions and the first and second interpolated car positions respectively. The interpolation device generates an interpolation parameter that characterizes a position of the first detection device relative to the first position marker and determines the first and second interpolated car positions on the basis of the interpolation parameter.

(12) United States Patent
Michel et al.

(10) Patent No.: US 11,548,759 B2
(45) Date of Patent: Jan. 10, 2023

(54) POSITION DETERMINING SYSTEM AND METHOD FOR DETERMINING A CAR POSITION OF AN ELEVATOR CAR

(71) Applicant: Inventio AG, Hergiswil (CH)

(72) Inventors: David Michel, Rotkreuz (CH); Eric Birrer, Buchrain (CH); Martin Pfister, Lucerne (CH)

(73) Assignee: INVENTIO AG, Hergiswil (CH)

( * ) Notice: Subject to any disclaimer, the term of this patent is extended or adjusted under 35 U.S.C. 154(b) by 489 days.

(21) Appl. No.: 16/612,795

(22) PCT Filed: Jun. 26, 2018

(86) PCT No.: PCT/EP2018/067141
§ 371 (c)(1),
(2) Date: Nov. 12, 2019

(87) PCT Pub. No.: WO2019/002309
PCT Pub. Date: Jan. 3, 2019

(65) Prior Publication Data
US 2020/0198929 A1    Jun. 25, 2020

(30) Foreign Application Priority Data
Jun. 27, 2017 (EP) ..................... 17178195

(51) Int. Cl.
*B66B 1/34* (2006.01)
*G01D 5/14* (2006.01)

(52) U.S. Cl.
CPC .......... *B66B 1/3492* (2013.01); *G01D 5/142* (2013.01)

(58) Field of Classification Search
None
See application file for complete search history.

(56) References Cited

U.S. PATENT DOCUMENTS 3,995,719 A   12/1976 Mandel et al.
4,433,756 A   2/1984 Caputo et al.
(Continued)

FOREIGN PATENT DOCUMENTS

CN   1326895 A   12/2001
CN   1371857 A   10/2002
(Continued)

OTHER PUBLICATIONS

Wen, Y. and Lin, H., The Testing Equipment of the Absolute Position of Elevator, Machiney & Electronics, Dec. 24, 2011, pp. 35-38, vol. 2011(12), China Academic Journal Electronic Publishing House, Beijing, China.

*Primary Examiner* — Patrick Assouad
*Assistant Examiner* — Haidong Zhang
(74) *Attorney, Agent, or Firm* — William J. Clemens; Shumaker, Loop & Kendrick, LLP

(57) ABSTRACT

A system and method for determining an elevator car position uses position markers situated in the elevator shaft and each assigned a discrete car position, first and second detection devices on the elevator car detecting first and second position markers respectively, and an evaluation unit that determines first and second discrete car positions based on the detected first and second position markers respectively. A single interpolation device of the position determining system determines first and second interpolated car positions. The evaluation unit determines first and second car positions based on the first and second discrete car positions and the first and second interpolated car positions respectively. The interpolation device generates an interpolation parameter that characterizes a position of the first detection device relative to the first position marker and determines the first and second interpolated car positions on the basis of the interpolation parameter.

12 Claims, 3 Drawing Sheets

(56) References Cited

U.S. PATENT DOCUMENTS

| | | |
|---|---|---|
| 6,286,629 B1 | 9/2001 | Saunders |
| 2004/0216320 A1 | 11/2004 | Birrer et al. |
| 2012/0312639 A1 | 12/2012 | Arnold et al. |
| 2013/0001023 A1 | 1/2013 | Leutenegger et al. |
| 2013/0284544 A1 | 10/2013 | De Coi et al. |
| 2014/0076670 A1* | 3/2014 | Henseler ............ B66B 1/466 187/331 |
| 2015/0307319 A1 | 10/2015 | Michel et al. |

FOREIGN PATENT DOCUMENTS

| | | |
|---|---|---|
| CN | 1486918 A | 4/2004 |
| CN | 1733584 A | 2/2006 |
| CN | 1733585 A | 2/2006 |
| CN | 1840461 A | 10/2006 |
| CN | 102020149 A | 4/2011 |
| CN | 102933478 A | 2/2013 |
| CN | 105480797 A | 4/2016 |
| CN | 105540369 A | 5/2016 |
| CN | 106064766 A | 11/2016 |
| EP | 1412274 B1 | 3/2011 |
| EP | 2546180 A1 | 1/2013 |
| JP | H0551178 A | 3/1993 |
| JP | 2013230936 A | 11/2013 |

\* cited by examiner

- CONTROL UNIT 35
- COUNTERWEIGHT 18
- 14 CAR
- 28 POSITION DETERMING SYSTEM
- 30 FIRST EVALUATION UNIT
- 31 SECOND EVALUATION UNIT
- 32 FIRST DETECTION DEVICE
- 33 SECOND DETECTION DEVICE

POSITION DETERMINING SYSTEM AND METHOD FOR DETERMINING A CAR POSITION OF AN ELEVATOR CAR

FIELD

The invention relates to a position determining system for ascertaining a car position of an elevator car movable in an elevator shaft and to a method for ascertaining a car position of an elevator car movable in an elevator shaft.

BACKGROUND

EP 1412274 B1 describes a position determining system and a method for ascertaining a car position of an elevator car movable in an elevator shaft. The position determining system has a code mark pattern attached next to the elevator car parallel to a direction of travel, wherein n consecutive code marks of the code mark pattern form a position mark. The code marks in this case form magnetic poles, so that the code mark pattern is composed of a series of magnetic north and south poles. The position markers are uniquely situated in an n-digit pseudorandom sequence of different position markers, wherein the position markers form a single-track code mark pattern. Each of the aforementioned position markers is assigned a discrete car position via an assignment table.

The position determining system has a first detection device situated on the vehicle car, which is able to detect a position marker. For this purpose, the first detection device includes a series of Hall sensors, which scan the code mark pattern in a contact-free manner and in this way detect the position mark. The position determining system also has a first evaluation unit, which determines a first discrete car position on the basis of the first position marker detected by the first detection device. A first interpolation device determines a first interpolated car position, by means of which the first evaluation unit together with the first discrete car position determines a first car position which, as a result of the use of the first interpolated car position, is more accurate than the first discrete car position alone.

The first interpolation device has a total of six Hall sensors, by means of which it determines the position of the first detection device with respect to the code mark pattern, and thus with respect to the first position marker in the direction of travel of the elevator car. Based on this, the first interpolation device determines the position of the first detection device between two consecutive position markers as the first interpolated car position.

Since knowledge of the position of the elevator car in the elevator shaft is relevant for the safe operation of an elevator system, the determination of the car position is carried out completely redundantly in the position determining system of EP 1412274 B1. The position determining system thus also includes a second detection device, a second evaluation unit and a second interpolation device, which are designed in conformity with the first detection device, the first evaluation unit and the first interpolation device. The second interpolation device includes separate additional Hall sensors, i.e., compared to the Hall sensors of the first interpolation device.

SUMMARY

In contrast, it is in particular an object of the invention to propose a position determining system and a method for ascertaining a car position of an elevator car, which may be particularly simply and thus cost-effectively implemented and at the same time enable a sufficiently reliable determination of the car position.

According to a first aspect of the invention, the position determining system according to the invention has position markers situated in the elevator shaft for ascertaining a car position of an elevator car movable in an elevator shaft, wherein each position marker is assigned a discrete car position, a first detection device attached to the elevator car for detecting a first position marker, a second detection device attached to the elevator car for detecting a second position marker and at least one evaluation unit. The evaluation unit determines a first discrete car position based on the first position marker detected by the first detection device, and a second discrete car position based on the second position marker detected by the second detection device. The position determining system also includes an interpolation device for determining an interpolated car position. The evaluation unit is provided for determining a first car position based on the first discrete car position and on a first interpolated car position, and a second car position based on the second discrete car position and on a second interpolated car position.

According to the invention, the position determining system includes only a single interpolation device, which is provided for generating one or multiple interpolation parameters, which characterize a position of the first detection device relative to the first position marker. The interpolation device determines the first and second interpolated car position based on the same interpolation parameter or on the same interpolation parameters. In this case, it is irrelevant which of the two detection devices of the position determining system is referred to as the first and which as the second detection device.

The first interpolation device in this case is able to determine only one single interpolated car position, which is utilized both as the first interpolated car position as well as the second interpolated car position. Alternatively, the interpolation device is able to determine the first interpolated car position separately from the second interpolated car position based on the same interpolation parameter or on the same interpolation parameters. In determining the first and second interpolated car position, knowledge, in particular, of the arrangement of the first and second detection devices relative to one another is used.

Thus, only one single interpolation parameter is required for determining the interpolated car position, and not two separate interpolation parameters as in the position determining system of EP 1412274 B1. As a result, the position determining system according to the invention manages with fewer sensors than the position determining system of EP 1412274 B1. Thus, the position determining system according to the invention may be cost-effectively implemented. In addition, the position determining system according to the invention requires only little installation space due to the small number of sensors.

In other words, in the position determining system according to the invention, the determination of the discrete car positions is dual-channeled and therefore redundant, and the determination of the interpolated car position is only single-channeled, i.e., not redundant. The Applicant has recognized that this approach allows for a sufficiently reliable determination of the car position, since an error in the interpolation device, for example, due to a defective sensor of the interpolation device, does not result in a safety-critical state of the elevator system. The resulting error in the car position is always smaller than the resolution of the discrete position determination, which is usually in the range of a few millimeters, for example 4-10 mm. Such a deviation of the determined car position from the actual car position is not safety-critical. With suitable measures, it is also possible to ensure that an error in the interpolation device is detected at least after a certain distance traveled.

A second aspect of the invention relates to an elevator system that includes such a position determining system.

The aforementioned object is achieved according to a third aspect of the invention by a method for ascertaining a car position of an elevator car movable in an elevator shaft, in which position markers situated in the elevator shaft are evaluated, wherein each position marker is assigned a discrete car position, a first detection device attached to the elevator car detects a first position marker, a second detection device attached to the elevator car detects a second position marker, an evaluation unit determines
a first discrete car position based on the first position marker detected by the first detection device and
a second discrete car position based on the second position marker detected by the second detection device
and
an interpolation device determines an interpolated car position.

The evaluation unit determines a first car position based on the first discrete car position and on a first interpolated car position, and a second car position based on the second discrete car position and on a second interpolated car position. According to the invention, the interpolation device determines an interpolation parameter, which characterizes a position of the first detection device relative to the first position marker. The interpolation device then determines the first and second interpolated car positions based on the same interpolation parameter. With regard to the designation of the detection devices and the determination of the first and second interpolated car positions, the same procedure applies to the method according to the invention as to the position determining system according to the invention.

The embodiments of the position determining system described below also apply analogously to the method for ascertaining a car position of an elevator car movable in an elevator shaft.

A position marker situated in the elevator shaft may, for example, be designed as a single-track code mark pattern comprising individual code marks, which is, in particular, part of a code mark band situated parallel to a direction of travel of the elevator car in the elevator shaft. The individual code marks may be formed, for example, by magnetic poles. It is also possible that the code marks have different dielectric constants or have a specific color or brightness, such as white and black. However, different complete position markers may also be situated one below the other in the direction of travel on a position marker band which, in particular, may be evaluated visually, for example, by means of a digital camera. The position markers may then be designed, for example, as a barcode or as a two-dimensional code. In addition, the position markers may be implemented in other ways.

A position marker is assigned to a discrete car position, in particular, via an assignment table stored in the evaluation unit. The assignment could also be made using a suitable algorithm. A discrete car position is to be understood here as a car position, which is determined solely on the basis of a detected position marker and on the described assignment. The accuracy or resolution of the discrete car positions depends mainly on the code mark length of the code marks, wherein the so-called coding of the code band may also be a factor. The code mark length may, for example, be between 4 mm and 20 mm, so that the accuracy or resolution is also between 4 mm and 20 mm. In a Manchester code of the code mark band described below, the accuracy or resolution is twice the code mark length.

The detection devices each include at least one sensor, in particular, multiple sensors, for detecting the position markers. A digital camera is also considered to be a sensor in this case. The type of sensor or sensors in this case is matched to the design of the position markers, the sensors may be designed, for example, as Hall sensors, capacitive effects detecting sensors, optical sensors or as a digital camera. In order to ensure the described two-channel determination of the discrete car position, each detection device has its own sensors and no information of the second detection device is evaluated for determining the first discrete car position, and vice versa. However, this does not preclude the possibility of the two detection devices being integrated in one component. The two detection devices have, in particular, a shared housing.

The two detectors may simultaneously detect either the same position marker or two different position markers. When the same position marker is detected, a position marker is assigned to a discrete car position via the same assignment table when two different position markers are detected then, in particular, via two different assignment tables. It is monitored, in particular, in each determination of a first and second discrete car position, whether the two discrete car positions are the same. If this is not the case, an error is detected and the elevator system is stopped, in particular, immediately.

The position determining system includes, in particular, two separate evaluation units, a first evaluation unit for determining the first discrete car position and a second evaluation unit for determining the second discrete car position. This makes it particularly easy to implement the two-channel determination of the discrete car position. It is also possible for the position determining system to include only a single evaluation unit, for example, based on an error-tolerant computer system, which enables a parallel processing of arithmetic operations. The aforementioned error-tolerant computer system may be designed, for example, as a so-called lockstep system.

The interpolation device generates as one or more interpolation parameters, which serve as a basis for determining the at least one interpolated car position, in particular, one or multiple sensor signals, from which the position of the first detection device relative to the first position marker may be derived. From this position, it is possible to determine an interpolated car position, which may be used as the first and second interpolated car position. The interpolated car position indicates, in particular, how much the car position is shifted from the determined discrete car position towards the next discrete car position in the direction of travel. For this purpose, the interpolated car position may be carried out as a percentage having a value range from zero to just below 100 percent or as a range with a value range between 0 and just below the resolution of the discrete car position. The minimum value of zero indicates that the car position corresponds exactly to the determined discrete car position and the maximum value indicates that the car position is just ahead of the next discrete car position in the direction of travel.

Since the arrangement of the second detection device relative to the first detection device and the arrangement of the second position marker relative to the first position marker is known, the position of the second detection device relative to the second position marker may also be determined from the position of the first detection device relative to the first position marker. Thus, the first interpolated car position may be determined from the position of the first detection device relative to the first position marker, and the second interpolated car position may be determined from the position of the second detection device relative to the second position marker.

The one single interpolation device may have one or multiple Hall sensors for this purpose. The sensors of the interpolation device may also serve simultaneously as sensors of the first or of the second detection device. Thus, a sensor may simultaneously be part of the first or of the second detection device and of the interpolation device. The interpolation parameter may also be embodied as the position of the position marker in the direction of travel in an image recorded by a camera. In this case, the interpolation requires no separate sensors. In this case, it derives the interpolation parameter from the camera image taken by the first or by the second detection device.

The one single evaluation unit or the first and second evaluation unit determine the first and second car position based on the first and second discrete car position and on the first and second interpolated car position. The approach depends on how the interpolated car position is configured. If the interpolated car position indicates, for example, a distance, the car position then results from the sum of the discrete car position and of the interpolated car position. If, for example, the interpolated car position is a relative indication as a percentage as described, the car position then results from the sum of the discrete car position and the product of the interpolated car position with the resolution of the discrete car position. Other influencing factors such as, for example, the result of a so-called fine interpolation in the determination of the car position may also be considered.

The position of the elevator car in the elevator shaft is needed by an elevator control unit of the elevator system in order to be able to move and position the elevator car safely and precisely within the elevator shaft. The speed and, if necessary, also the acceleration of the elevator car may be determined by means of an observation in time of the path of the position in the direction of travel. These variables are used, in particular, also by the elevator control unit. The speed and/or the acceleration of the elevator car may be determined, in particular, by the first and/or second evaluation unit, but also by the elevator control unit.

For this purpose, the position determining system transmits the car position and, if necessary, the speed and acceleration of the elevator car via a communication link to the elevator control unit. It is possible in this case for the first and second car position to be transmitted to the elevator control unit. Alternatively, only one car position may be transmitted to the elevator control unit, wherein either the first or the second car position or a combination thereof, for example, the average of the two car positions, may be transmitted to the elevator control.

In an embodiment of the invention, the interpolation device includes a single interpolation detection device for generating the aforementioned interpolation parameter, a first interpolation evaluation unit for determining the first interpolated car position and a second interpolation evaluation unit for determining the second interpolated car position.

The interpolation parameter generated by the interpolation detection device is thus further processed by both interpolation evaluation units, in particular, independently of one another. This is particularly advantageous if the position determining system includes a first and a second evaluation unit. If the interpolation device in this case included only one interpolation evaluation unit, a complex synchronization of the two evaluation units and of the interpolation evaluation unit would be necessary.

The first and second interpolation evaluation unit are integrated, in particular, into the first and second evaluation unit, respectively. However, they may also be designed as independent units, for example, in each case as a microcontroller.

The one single interpolation detection device includes one or multiple sensors, for example, in the form of Hall sensors, which output, in particular, an analog sensor signal. Such a sensor signal may be considered to be an interpolation parameter. If the interpolation evaluation units are implemented on a microcontroller, the analog sensor signals must be converted into a digital signal by means of analog-digital converters. In this case, the interpolation device includes, in particular, two analog-digital converters, one analog-digital converter each being assigned to an interpolation evaluation unit. This allows for a simple synchronization of the interpolation evaluation units and of the two analog-to-digital converters.

In an embodiment of the invention, the interpolation device is provided for determining only a single interpolated car position, which is utilized as the first and second interpolated car position. The interpolation device in this case may be part of the first or second evaluation unit. Thus, there is only a single interpolation device that supplies both evaluation units with the interpolated car position necessary for determining the car position. Thus, comparatively little computing capacity is necessary for determining the car position, which allows for a cost-effective implementation of the position determining system. This embodiment is advantageous, in particular, if the position markers are visually detected. In this case, the interpolation device requires no separate sensors, but only evaluates the image detected by one of the two detection devices.

In an embodiment of the invention, the interpolation device includes multiple sensors, wherein each of the sensors of the interpolation device is simultaneously also part of the first or second detection device. All sensors of the interpolation device are thus utilized twice, which makes a small number of sensors necessary. The position determining system is thus particularly cost-effective and requires very little installation space. In this case, an error of any sensor of the interpolation device may also be very easily detected. This results from the fact that an error of a sensor of the first or second detection device may be detected very easily by comparing the first and second discrete car positions. By comparison, an error detection of a sensor, which is used only by the interpolation device, would be much more complex.

In an embodiment of the invention, the position determining system includes a code mark pattern attached next to the elevator car parallel to a direction of travel, wherein n successive code marks of the code mark pattern form a position marker. The position markers are uniquely situated in an n-digit pseudorandom sequence of various position markers, and the position markers form a single-track code mark pattern. The first and second detection devices are provided to scan the code mark pattern in a contact-free manner in order to detect the first position marker. Thus, a particularly accurate determination of the car position is possible.

The code mark patterns are coded in particular in Manchester coding. This ensures that a change in the value of the code mark takes place after no later than two consecutive code marks. Such a change may be utilized for generating the interpolation parameter used for generating the interpolated car position, which characterizes the position of the first detection device relative to the first position marker, and thus also indirectly the position of the second detection device relative to the second position marker. Thus, the Manchester coding allows for a particularly accurate determination of the interpolated car position.

The code marks form, in particular, magnetic poles and the detection devices and the interpolation device include, in particular, Hall sensors. Thus, the implementation of the position determining system is particularly cost-effective.

The code mark pattern is coded and designed, in particular, like the code mark pattern of EP 1412274 B1.

In an embodiment of the invention, the interpolation device includes multiple sensors for detecting code mark transitions, which are situated in the direction of travel over a range having a length greater than the length (2λ) of two code marks at a distance smaller than the length of one code mark (λ). Thus, a particularly accurate determination of the interpolated car position is possible.

The interpolation device includes, in particular, 6 sensors for detecting code mark transitions. The length of a code mark (λ) may be, for example, between 2 mm and 12 mm, in particular, 4 mm or 8 mm.

The sensors of the interpolation device are designed and situated, in particular, analogously to the sensors of the interpolation device of EP 1412274 B1.

In an embodiment of the invention, the evaluation unit is provided for outputting an error signal when the first and second discrete car position differ from each other. Thus, an error in the determination of the car position may be detected very quickly and easily, which allows for a safe operation of the elevator system.

Additional advantages, features, and details of the invention will become apparent from the following description of exemplary embodiments and from the drawings, in which identical or functionally identical elements are provided with identical reference numerals.

DESCRIPTION OF THE DRAWINGS

In which.

DETAILED DESCRIPTION

Figure 1:
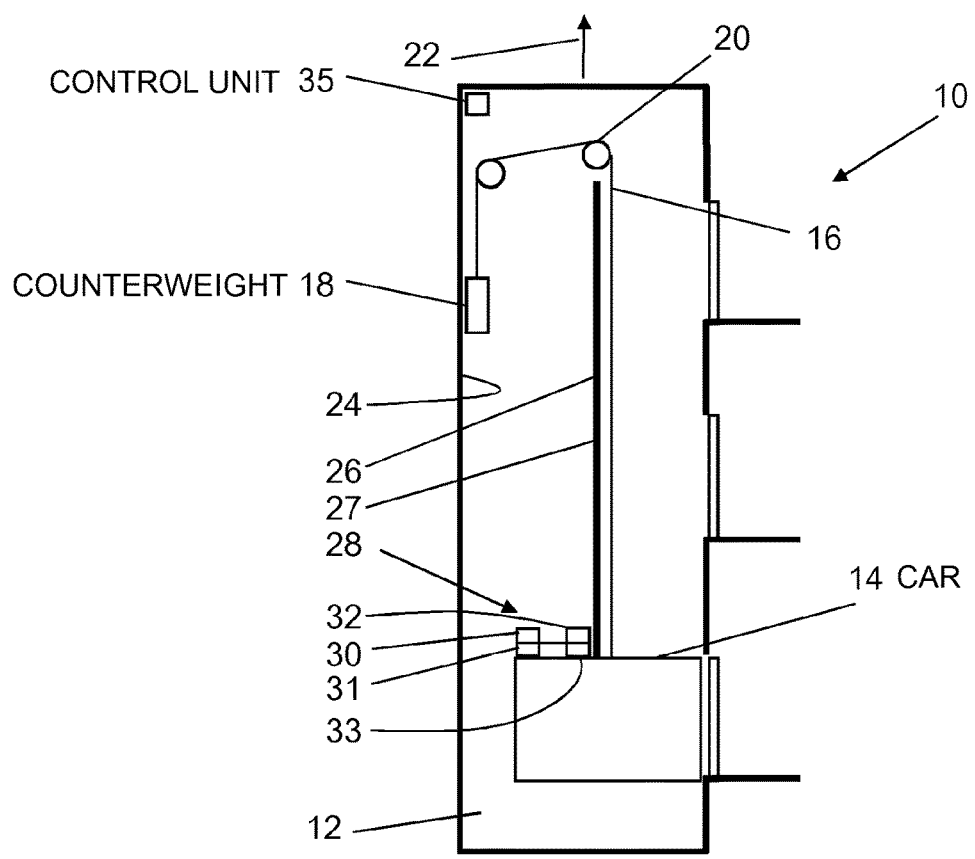
FIG. 1 shows a schematic representation of an elevator system that includes a position 3 elevator shaft.

According to FIG. 1, an elevator system 10 has an elevator shaft 12 oriented in a vertical direction. Situated within the elevator shaft 12 is an elevator car 14, which is connected in a known manner to a counterweight 18 via a carrier means 16 in the form of a flexible band or cable. The carrier means 16, starting from the elevator car 14, extends via a drive pulley 20, which may be driven by a drive motor not shown, to the counterweight 18. The elevator car 14 may be moved up and down in the elevator shaft 12 by means of the drive motor and the carrier means 16. The elevator car 14 may thus be moved in the elevator shaft 12 in or opposite a direction of travel 22, which extends vertically upward.

A guide rail 26, which extends in the direction of travel 22, is fixed on a shaft wall 24 of the elevator shaft 12. The elevator car 14, when moved, is guided along the guide rail 26 via guide shoes not shown.

Figure 2:
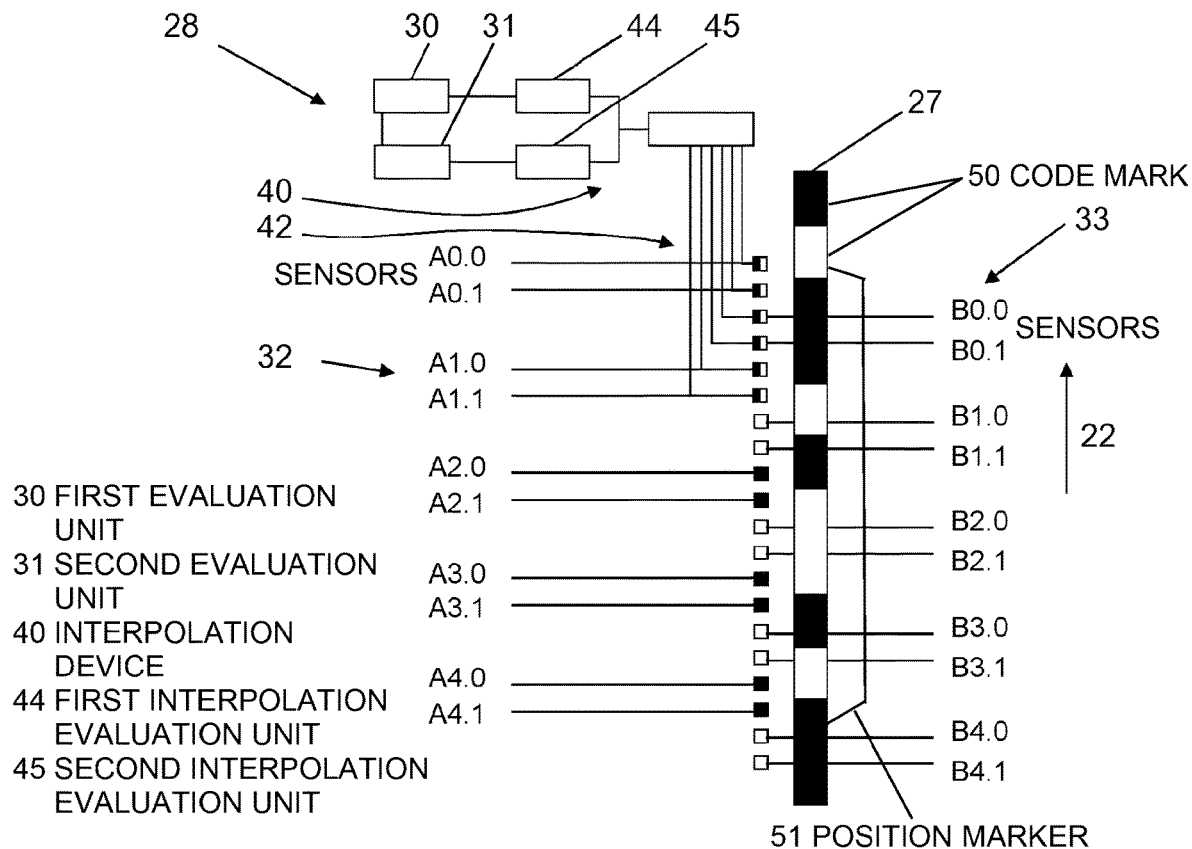
FIG. 2 shows a schematic representation of a position determining system.

Situated on the guide rail 26 is a code band 27 in the form of a magnetic tape, which is shown in greater detail in FIG. 2 and is described in greater detail in conjunction with FIG. 2. The code band 27 serves as a carrier for a single-track combined code mark pattern, which represents the numerical code of absolute positions of the elevator car 14 in the shaft 12 in relation to a zero point. The code band could also be situated separately from a guide rail in the elevator shaft.

Parts of a position determining system 28 for ascertaining a car position of the elevator car 14 are situated on the elevator car 14. The position determining system 28 has a first evaluation unit 30, a second evaluation unit 31, a first detection device 32 and a second detection device 33, all of which are situated on the elevator car 14. The position determining system 28 also includes the code band 27 and is shown in greater detail in FIG. 2 and is described in greater detail in conjunction with FIG. 2.

The first detection device 32 and the second detection device 33 are situated on the elevator car in such a way that they are able to detect position markers formed by the code band 27. Thus, the position determining system 28 may determine and transmit the car position of the elevator car 14 via a communication link not shown to an elevator control unit 35 situated in the elevator shaft 12, which uses the car position of the elevator car 14 for controlling the elevator system 10.

FIG. 2 schematically shows the position determining system 28, including a part of the code band 27. The code band 27 has a single-track combined code mark pattern. The individual code marks are symbolized by rectangular sections of equal length situated in one track in the longitudinal direction of the code band 27 having a length of λ=4 mm and magnetized either as a magnetic north pole (white rectangle) or as a magnetic south pole (black rectangle). The individual north poles and south poles form outwardly correspondingly oriented magnetic fields. A code mark is also referred to here as a bit. The coding of the code band 27 is constructed from a so-called binary pseudorandom sequence. A pseudorandom sequence consists of consecutively arranged bit sequences having b binary digits. With each movement up by one bit in the binary pseudo-random sequence, a new b-digit binary bit sequence is then known to arise in each case. Such a sequence b of consecutive bits is referred to below as a codeword.

The example of the code band 27 shown in FIG. 2 is based on a pseudorandom sequence of codewords having b=4 digits. The number of digits may also be significantly higher, for example, b=14 or 16. In the direction of travel 22 of the described pseudorandom sequence, a bit having a value "1" is inserted after each bit having a value "0", and a "0" bit is inserted after each "1" bit. Consequently, a bit change takes place in the single-track combined code mark pattern no later than after two bits. This type of coding is known as so-called Manchester coding. This is shown on the code band 27 in FIG. 2 in that only magnetic poles of the length L=λ=4 mm and twice the length of L=2λ=8 mm are present and that after L=2λ=8 mm at the most, a transition occurs from a north pole to a south pole or vice versa. As a result of the described doubling of the bits, a clear 5-digit read pattern without repetition of codewords is read out while simultaneously scanning respectively b+1=5 consecutive of the respective second bits of the combined code mark pattern. Such a 5-digit reading pattern thus represents a position marker situated in the elevator shaft 12. The position marker 51 is thus composed of a total of ten, i.e., n=10 consecutive code marks 50 and has a position marker length $L_P$ of 10*λ=40 mm.

Accordingly, the first detection device 32 for reading the five bit position markers comprises five sensor pairs (A0.0, A0.1; A1.0, A1.1; A2.0, A2.1; A3.0, A3.1; A4.0, A4.1). The sensor pairs (Ax.0, Ax.1) of the first detection device 32 are situated in the direction of travel 22 on a line having a distance corresponding to the length 2λ=8 mm of two magnetic poles. The two sensors Ax.0 and Ax.1 of each of the sensor pairs (Ax.0, Ax.1) separate a mutual distance of the size of a half code mark length λ/2=2 mm. If one of the two sensors Ax.0, Ax.1 is near a magnetic pole change and provides a sensor voltage of approximately zero, then the other sensor Ax.0 or Ax.1 in each case is certainly within coverage of one of the magnetic poles and provides a reliable piece of information. All five first sensors Ax.0 are combined to form a first group and all five second sensors Ax.1 are combined to form a second sensor group. Of the sensors Ax.0 of the first sensor group and of the sensors Ax.1 of the second sensor group offset in the direction of travel 22 by half the code mark length λ/2=2 mm, only the output signals of the sensors of one of two sensor groups are alternately selected and evaluated for position reading. Thus, a detected signal mark is composed of five simultaneously read bits, wherein, however, only every other bit of the combined code mark pattern is read.

The five bits of a position marker simultaneously read by the first detection device 32 in the described manner are interpreted jointly by the first evaluation unit 30 as a five-digit codeword. Each of these five-digit codewords of the combined code mark pattern is assigned a first discrete car position of the elevator car 14 via an assignment table in a memory of the first evaluation unit 30. The resolution of the discrete car position here is 8 mm, which corresponds to twice the length λ of a code mark.

The second detection device 33 also includes five sensor pairs (B0.0, B0.1; B1.0, B1.1; B2.0, B2.1; B3.0, B3.1; B4.0, B4.1) for reading the five bit position markers. The five sensor pairs (Bx.0, Bx.1) are also situated in a row analogous to the five sensor pairs (Ax.0, Ax.1) of the first detection device 32. The five sensor pairs (Bx.0, Bx.1) of the first evaluation unit 32 are each shifted by a code mark length λ=4 mm in relation to the five sensor pairs (Ax.0, Ax.1) of the first detection device 32 in the direction of travel 22, so that they interlink. Thus, a sensor pair (Ax.0, Ax.1) of the first detection device 32 and a sensor pair (Bx.0, Bx.1) of the second detection device 33 invariably alternate in the direction of travel 22. Thus, the position of the second detection device 33 with respect to the first detection device 32 is also known.

The second evaluation unit 33 determines, analogously to the first evaluation unit 32, a second discrete car position. Thus, the determination of the first and second car positions takes place independently of each other, i.e., dual-channeled or redundantly.

The above describing switching to the respectively correct sensor group of the two sensor groups of the first and second detection devices 32, 33 takes place by determining the position of the pole transition between a south pole and a north pole with the aid of an interpolation device 40. The interpolation device 40 has a single interpolation detection device 42 which controls the sensor pairs A0.0, A0.1; B0.0, B0.1 and A1.0, A1.1, which are thus both part of the interpolation detection device 42 as well as of the first and second detection devices 32, 33. The interpolation detection device 42 thus comprises a total of six sensors in the form of Hall sensors, all of which are simultaneously also part of the first or second detection device 32, 33.

The sensors (A0.0, A0.1; B0.0, B0.1; A1.0, A1.1) of the interpolation detection device 42 are thus each situated at a distance of λ/2=2 mm from each other. The distance of the first sensor A0.0 to the last sensor A1.1 is 10 mm and thus more than the length of two code marks 2λ=8 mm. There is necessarily a zero point, i.e., a pole transition of the above-described combined code mark pattern in the area between the first sensor A0.0 and the last sensor A1.1 of the interpolation detection device 42. The interpolation device 40 detects the quasi-equidistant pole transitions or zero crossings of the magnetic field between two successive north poles or south poles.

Figure 3:
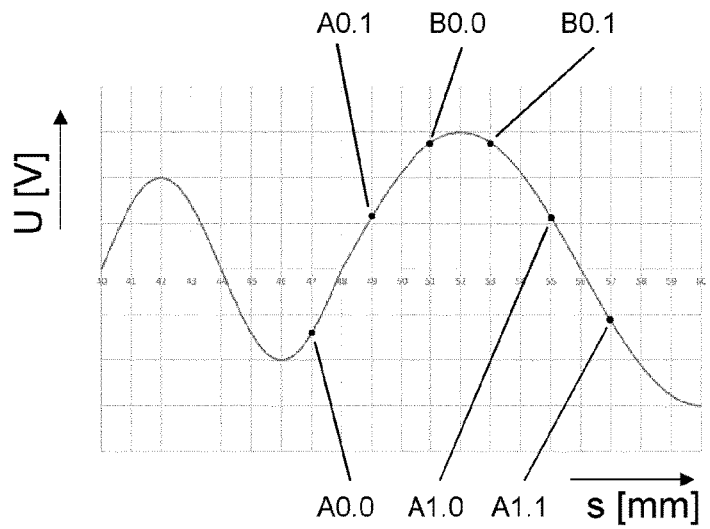
FIG. 3 shows a profile of an output signal of an interpolation device of the position determining system.

FIG. 3 shows an example of the output voltages of the six sensors A0.0, A0.1; B0.0, B0.1; A1.0, A1.1 of the interpolation detection device 42 over the path in the direction of travel 22 at millimeter intervals. The output voltages of the six sensors A0.0, A0.1; B0.0, B0.1; A1.0, A1.1 are thus interpolation parameters, which characterize a position of the first detection device 32 relative to the first position marker and thus indirectly a position of the second detection device 33 relative to the second position marker. The voltages of the individual sensors A0.0, A0.1; B0.0, B0.1; A1.0, A1.1 are evaluated as follows, wherein the number in each case represents the result of the aforementioned query (0=>false, 1=>correct):

$U(A0.0)>0=>0$ $U(A0.0)+\frac{1}{3}U(A0.1)>0=>0$ $U(A0.0)+U(A0.1)>0=>1$ $\frac{1}{3}U(A0.0)+U(A0.1)>0=>1$ $U(A0.1)>0=>1$ etc.

$U(B0.1)+\frac{1}{3}U(A1.1)>0=>1$

For the example shown in FIG. 3, this yields the number sequence: 0011111111111111111. This expresses the fact that at the first interpolation sensor A0.0 to 0.5 mm a south pole extends behind. A north pole is located from 1.0 mm to 9 mm behind the first interpolation sensor A0.0.

The generated digit sequence is decoded via a table stored in the interpolation device 40 into a three-digit binary number sequence, which represents an interpolated car position of 3 mm in the example illustrated. This is periodic with the code mark length λ and indicates the polarity of the band from the location of the first Hall sensor A0.0, calculated stepwise in, for example, 0.5 mm increments. The highest value bit of this interpolated car position inverts at a distance of 2 mm and takes over as the scanning signal that for the described switching between the sensor groups of the detection device 32, 33. The interpolated car position thus ascertained is added to the respective discrete car position.

The described evaluation of the output voltages of the six sensors A0.0, A0.1; B0.0, B0.1; A1.0, A1.1 is carried out separately in each case in a first interpolation evaluation unit 44 and in a second interpolation evaluation unit 45. The first interpolation evaluation unit 44 thus determines a first interpolated car position and the second interpolation evaluation unit 45 determines a second interpolated car position. The basis in both cases is provided by the output voltages of the six sensors A0.0, A0.1; B0.0, B0.1; A1.0, A1.1, i.e., the same interpolation parameters, which characterize a position of the first detection device 32 relative to the first position marker, and thus also indirectly a position of the second detection device 33 relative to the second position marker.

The first evaluation unit 30 adds the first interpolated car position to the first discrete car position and in this way determines a first car position. The second evaluation unit 31 analogously adds the second interpolated car position to the second discrete car position and in this way determines a second car position. The first evaluation unit 30 forms an average value of the first and second car position and transmits this value as the car position of the elevator car to the elevator control unit 35.

The two evaluation units 30, 31 also continuously compare the first and second discrete car positions. If one of the two evaluation units 30, 31 determines that the two discrete car positions deviate from each other, it immediately generates an error signal, as a result of which the elevator system 10 is immediately stopped.

Figure 4:
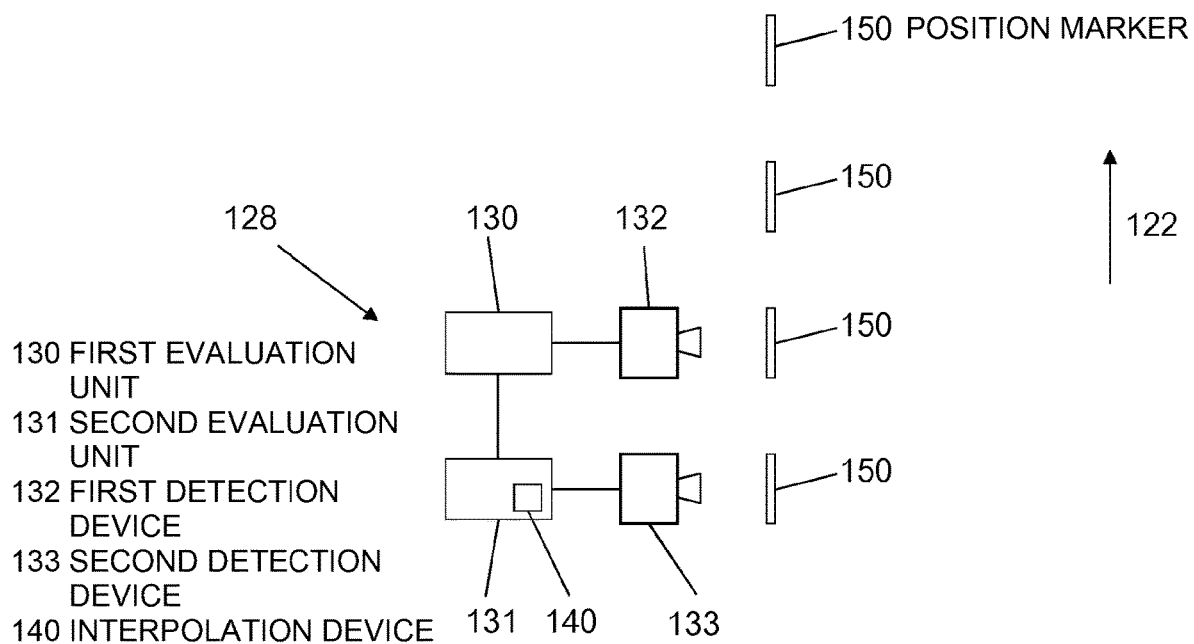
FIG. 4 shows a schematic representation of an alternative exemplary embodiment of a position determining system.

According to FIG. 4, an alternative position determining system 128 includes position markers 150, which are detected by a first detection device 132 in the form of a first camera and by a second first detection device 133 in the form of a second camera 133. The position markers 150 are situated one below the other in the elevator shaft, for example, on a shaft wall.

Figure 5:
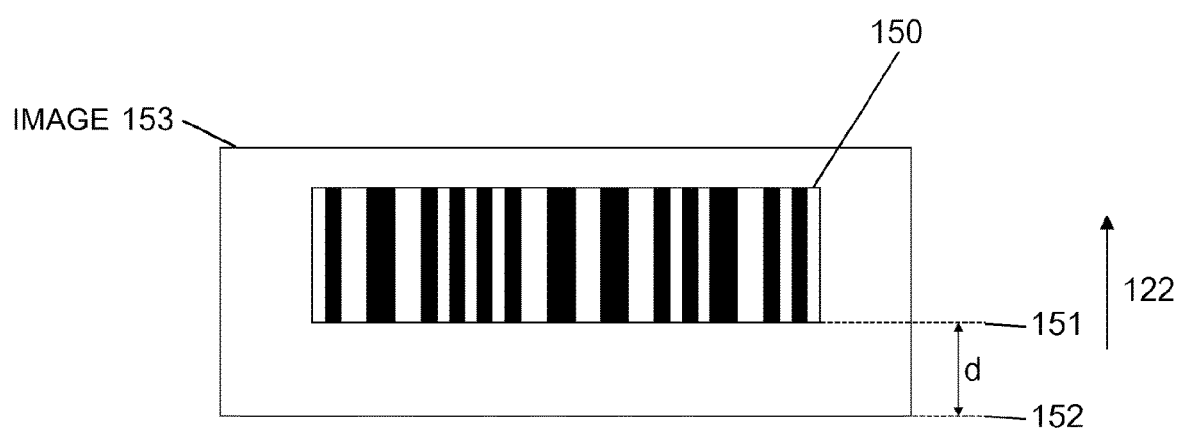
FIG. 5 shows a position marker of the position determining system of FIG. 4.

The position markers 150 are each designed as a barcode. FIG. 5 shows an example of a position marker 150. The barcode represents, in particular, a sequence of numbers, which is read out by a first or second evaluation unit 130, 131 from the images captured by the cameras 132, 133. A discrete car position is determined in each case by the first and second evaluation unit 130, 131 from the number sequence via an assignment table stored in the first and/or second evaluation unit 130, 131. Such position markers are situated in the elevator shaft at regular intervals of, for example, 10 mm one below the other, each position marker representing a different sequence of numbers. The position marker could also consist of a visually detectable two-dimensional code.

The second evaluation unit 131 also includes an interpolation device 140, which determines an interpolated car position. For this purpose, the interpolation device 140 determines a distance d between a lower edge 151 of the position marker 150 and a lower edge 152 of the image 153 captured by the camera 133. The distance d indicates how far the camera 133 is shifted relative to the position marker 150 in the direction of travel 122. The distance d is thus an interpolation parameter, which characterizes the position of the second detection device 133 relative to the second position marker 150. The distance d may be used as the second interpolated car position. The second car position then results from the second discrete car position and the second interpolated car position.

The second evaluation unit 131 transmits the second interpolated car position as the first interpolated car position to the first evaluation unit 130, which determines the first car position from the first discrete car position and the first interpolated car position.

The interpolation device thus determines only a single interpolated car position, which is used by the first evaluation unit 130 as the first interpolated car position and by the second evaluation unit 131 as the second interpolated car position.

The position determining system 128 also transmits the car position to an elevator control unit not shown in FIG. 4 and also includes an error monitoring analogous to the position determining system 28.

Finally, it should be noted that terms such as "including", "comprising", etc. do not exclude any other elements or steps and terms such as "an" or "a" do not exclude any plurality. It should further be noted that features or steps which have been described with reference to one of the above exemplary embodiments may also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A position determining system for determining a car position of an elevator car movable in an elevator shaft, comprising:
a plurality of position markers situated in the elevator shaft, wherein each of the position markers is assigned to a different discrete car position in the elevator shaft;
a first detection device attached to the elevator car for detecting a first of the position markers;
a second detection device attached to the elevator car for detecting a second of the position markers;
an evaluation unit for determining a first discrete car position in the elevator shaft based on the first position marker detected by the first detection device and for determining a second discrete car position in the elevator shaft based on the second position marker detected by the second detection device;
an interpolation device for determining an interpolated car position of the elevator car in the elevator shaft;
wherein the evaluation unit determines a first car position based on the first discrete car position and a determined first interpolated car position from the interpolation device and determines a second car position based on the second discrete car position and a determined second interpolated car position from the interpolation device; and
wherein the interpolation device includes a single interpolation device that generates an interpolation parameter that characterizes either a position of the first detection device relative to the first position marker or a position of the second detection device relative to the second position marker and determines the first and second interpolated car positions based on the interpolation parameter.

2. The position determining system according to claim 1 wherein the interpolation device includes a first interpolation evaluation unit for determining the first interpolated car position and a second interpolation evaluation unit for determining the second interpolated car position.

3. The position determining system according to claim 1 wherein the interpolation device determines a single interpolated car position that is utilized as the first and the second interpolated car positions.

4. The position determining system according to claim 1 wherein the interpolation device includes a plurality of sensors and wherein each of the sensors is included in the first detection device or in the second detection device.

5. The position determining system according to claim 1 including a code mark pattern of code marks placed next to the elevator car parallel to a direction of travel of the elevator car in the elevator shaft, wherein n consecutive ones of the code marks of the code mark pattern form each of the position markers, wherein the position markers are uniquely situated in an n-digit pseudorandom sequence, wherein the position markers form a single-track code mark pattern, and wherein the first detection device and the second detection device scan the code mark pattern in a contact-free manner to detect the first position marker and the second position marker.

6. The position determining system according to claim 5 wherein the code mark pattern is coded in Manchester coding.

7. The position determining system according to claim 5 wherein the code marks form magnetic poles and the first and second detection devices and the interpolation device each include Hall sensors.

8. The position determining system according to claim 5 wherein the code marks have a same predetermined length in the direction of travel and the interpolation device includes multiple sensor pairs for detecting transitions between adjacent ones of the code marks in the direction of travel, the sensor pairs being situated over a range having a length greater than twice the predetermined length and the sensors being spaced apart at a distance smaller than the predetermined length.

9. The positioning system according to claim 1 wherein the evaluation unit outputs an error signal to an elevator system controlling the elevator car when the first and second discrete car positions differ from each other.

10. An elevator system comprising:
an elevator car movable in an elevator shaft; and
the position determining system according to claim 1.

11. A method for determining a car position of an elevator car movable in an elevator shaft, wherein a plurality of position markers are situated in the elevator shaft with each of the position markers being assigned to a different discrete car position, wherein a first detection device is attached to the elevator car and a second detection device is attached to the elevator car, the method comprising the steps of:
detecting a first of the position markers with the first detection device;
detecting a second of the position markers with the second detection device;
determining with an evaluation unit a first discrete car position based on the first position marker detected by the first detection device and a second discrete car position based on the second position marker detected by the second detection device;
determining with an interpolation device an interpolated car position;
wherein the evaluation unit determines a first car position on the basis of the first discrete car position and a determined first interpolated car position from the interpolation device, and determines a second car position on the basis of the second discrete car position and a determined second interpolated car position from the interpolation device; and
wherein the interpolation device is a single interpolation device that determines an interpolation parameter that characterizes either a position of the first detection device relative to the first position marker or a position of the second detection device relative to the second position marker and determines the first and second interpolated car positions based on the interpolation parameter.

12. A position determining system for determining a car position of an elevator car movable in an elevator shaft, comprising:
a plurality of position markers situated in the elevator shaft, wherein each of the position markers is assigned to a different discrete car position in the elevator shaft;
a first detection device attached to the elevator car for detecting a first of the position markers;
a second detection device attached to the elevator car for detecting a second of the position markers;
an evaluation unit for determining a first discrete car position in the elevator shaft based on the first position marker detected by the first detection device and for determining a second discrete car position in the elevator shaft based on the second position marker detected by the second detection device;
a single interpolation device for determining an interpolated car position of the elevator car in the elevator shaft;
wherein the evaluation unit determines a first car position based on the first discrete car position and a determined first interpolated car position from the interpolation device and determines a second car position based on the second discrete car position and a determined second interpolated car position from the interpolation device;
wherein the interpolation device generates an interpolation parameter that characterizes either a position of the first detection device relative to the first position marker or a position of the second detection device relative to the second position marker and determines the first and second interpolated car positions based on the interpolation parameter; and
wherein the evaluation unit outputs an error signal to an elevator system controlling the elevator car when the first and second discrete car positions differ from each other.

* * * * *